United States Patent [19]

Pepys et al.

[11] Patent Number: 5,735,576
[45] Date of Patent: Apr. 7, 1998

[54] HEAD SUPPORT FOR INFANTS AND TODDLERS

[75] Inventors: Shirley Pepys, Balboa Island; Debra L. Dunne, Mission Viejo, both of Calif.

[73] Assignee: Noel Joanna, Inc., Rancho Santa Margarita

[21] Appl. No.: 668,097

[22] Filed: Jun. 18, 1996

[51] Int. Cl.$^6$ .................................................. A47C 7/36
[52] U.S. Cl. ............... 297/397; 297/219.12; 297/DIG. 6
[58] Field of Search ................................. 297/397, 391, 297/DIG. 6, 250.1, 219.12, 220, 219.1, 229, 393; 5/636, 640

[56] References Cited

U.S. PATENT DOCUMENTS

| | | | |
|---|---|---|---|
| 4,666,207 | 5/1987 | Quartano | 297/219.12 X |
| 4,695,092 | 9/1987 | Hittie | 297/219.12 |
| 4,761,032 | 8/1988 | Sanchez et al. | 297/229 |
| 4,885,200 | 12/1989 | Perdelwitz, Jr. et al. | 297/219.12 X |
| 5,228,745 | 7/1993 | Hazel | 297/219.12 X |
| 5,366,271 | 11/1994 | Johnston et al. | 297/250.1 |
| 5,383,711 | 1/1995 | Houghteling | 297/397 |
| 5,486,037 | 1/1996 | Harper | 297/219.12 X |
| 5,544,378 | 8/1996 | Chow | 297/397 X |

*Primary Examiner*—Milton Nelson, Jr.
*Attorney, Agent, or Firm*—Graham & James LLP

[57] ABSTRACT

A head support which grows with the child from small infant to advanced toddler. A soft body structure has a central portion comprising an upper, intermediate and lower section and a pair of flanking padded wing portions secured to the upper central portion and having a fold seam at the junction with the upper central portion. The intermediate central portion has a pair of flanking tab portions each provided with a fastener strip, and the lower central portion terminates in a pair of leg portions separated by a gap. The upper side edges of the lower central portion are provided with a plurality of fastener strips. A plurality of fastener tabs are attached to the lower edge of each wing portion in order to provide adjustment in three dimensions of the relative attitudes of the wing portions in the central body portion. The support can be used in a folded attitude or an upstanding attitude, depending on the size of the child.

8 Claims, 2 Drawing Sheets

1

HEAD SUPPORT FOR INFANTS AND TODDLERS

BACKGROUND OF THE INVENTION

This invention relates to head supports in general, and more particularly pertains to a head support for use with swings, strollers, conventional car seats and infant carrier/car seats.

The need for a head support for infants and toddlers is well established in the prior art. In general, several different types of head support designs are known which share a common purpose in providing support for the head of an infant or a toddler when the infant or toddler is installed in a conventional car seat, a combination infant carrier/car seat, a swing, a stroller or other devices used to transport infants and toddlers. Some head supports are designed and dimensioned to be suitable for use with only infants; others are designed and dimensioned to be suitable for use only with toddlers. Still others represent attempts to provide a head support suitable for use with both infants and toddlers.

The first two types of head support, while useful, have limited utility specific to the size of the child. Thus, a head support designed for use with an infant cannot be used safely with a toddler and vice-versa. This often requires the purchase of two different head supports by a parent over an approximate four-year span, which is uneconomical. Head supports which have been designed for use with both infants and toddlers typically contain separate add-on components to expand the dimensions of the support, several individually adjustable elements in order to provide the dimensional adjustments, or both. Ideally, a head support designed for both infants and toddlers should be relatively inexpensive to manufacture and exceedingly simple to install and adjust to the size of the child. Efforts to date to provide such a variable use head support have not met with success.

SUMMARY OF THE INVENTION

The invention comprises a head support which is suitable for use with infants and toddlers which is relatively inexpensive to manufacture, simple to install and use, and adaptable to provide head support for children ranging in size from an infant to a toddler of approximately four years old.

In its most general aspect, the invention comprises a soft pliable body structure having a pair of flanking wing portions joined to the upper region of a compound central portion. The compound central portion includes a lower region and a region intermediate the upper region and the lower region. A plurality of complementary fastener elements are arranged along the lower edge of each wing portion and the outer perimeter of the intermediate and lower regions of the central portion to permit three-dimensional adjustment of the relative positions of the wing portions and the central portion. The lower region of the central portion terminates in a pair of leg sections separated by a gap for accommodating an automobile seat belt.

The pliable body structure preferably is fabricated using outer panels and a padding material positioned therebetween, with the padding being arranged thicker in the wing portions than in the central portion. A fold seam is preferably provided between each of the wing portions and the central portion in order to promote folding therebetween. The intermediate region includes opposing flap sections having upper and lower edges forming gaps with the lower and upper edges of the upper and lower regions of the central portion, respectively, in order to provide safety belt apertures for use with automotive safety belts.

The plurality of complementary fastener elements comprises a first group of fastener tabs each attached at a different location of the lower periphery of the wing portions, and a second group of fastener strips each secured at a different location of the outer perimeter of the intermediate and lower regions of the central portion at a position adjacent an associated one of the fastener tabs. Each of the pair of opposing flap portions of the intermediate region of the central portion has a fastener strip secured thereto; and each of the wing portions has a fastener tab located along an outer edge thereof.

For a fuller understanding of the nature and advantages of the invention, reference should be made to the ensuing detailed description, taken in conjunction with the accompanying drawings.

DETAILED DESCRIPTION OF THE PREFERRED EMBODIMENTS

Figure 1:
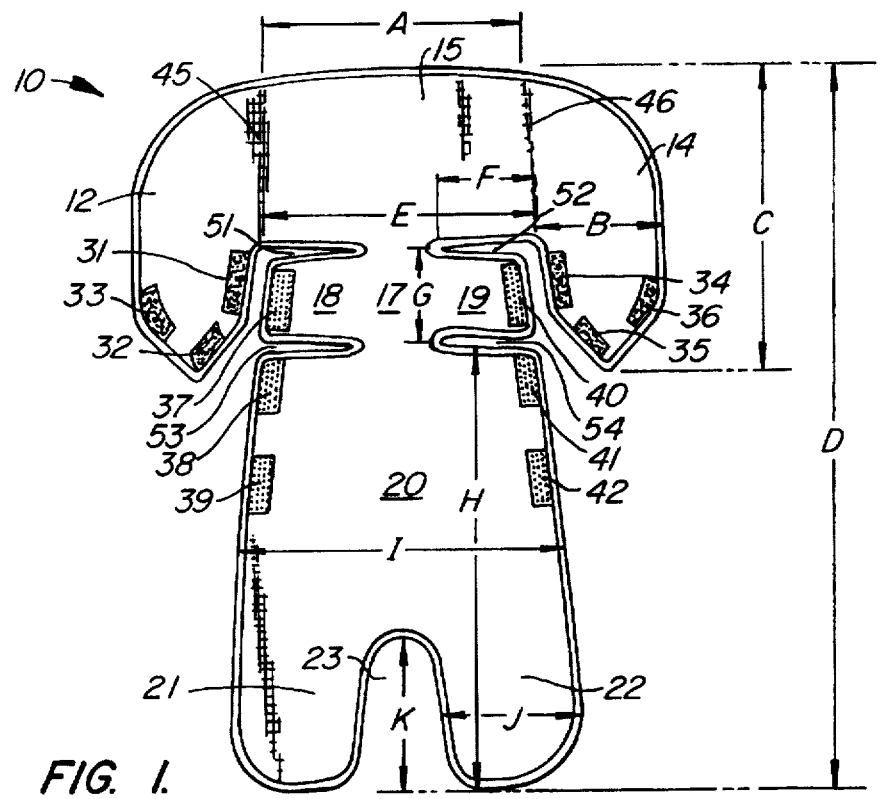
FIG. 1 is a plan view of the front side of the preferred embodiment of the invention.

Turning now to the drawings, FIG. 1 is a plan view of the front side of a preferred embodiment of the invention. As seen in this figure, the support, which is generally designated with reference numeral 10, includes a pair of flanking padded wing portions 12, 14 joined by an upper central portion 15. Positioned below upper central portion 15 is an intermediate central portion 17 terminating in a pair of flanking flap portions 18, 19. Positioned below intermediate central portion 17 is a lower central portion 20 terminating in a spaced pair of leg portions 21, 22 with a gap 23 therebetween. Secured to the inner and lower edges of wing portions 12, 14 are a plurality of fastener tabs 31–36. Secured to the outer edges of central portions 17 and 20 are a plurality of complementary fastener strips 37–42. Tabs 31–36 and strips 37–42 are preferably complementary hook and eye fasteners of the type sold under the trademark Velcro™, and are used to adjust the configuration of the support 10 to conform to the size of the child being accommodated.

The support 10 is preferably fabricated from two panels of polycotton terrycloth with cotton backing sewn together or otherwise fastened together along the perimeter with a polyester fill material in between. The amount of polyester fill material in wing portions 12, 14 is substantially greater than that in the central portions 15, 17 and 20 so that the wing portions 12, 14 provide additional cushion to the head of the infant or toddler. Wing portions 12, 14 are intended to be folded at least partially about the head of the infant or toddler, and for this purpose a fold seam 45, 46 is provided by stitching or the like to define the fold seam between each wing portion 12, 14 and the upper central portion 15.

Figure 2:
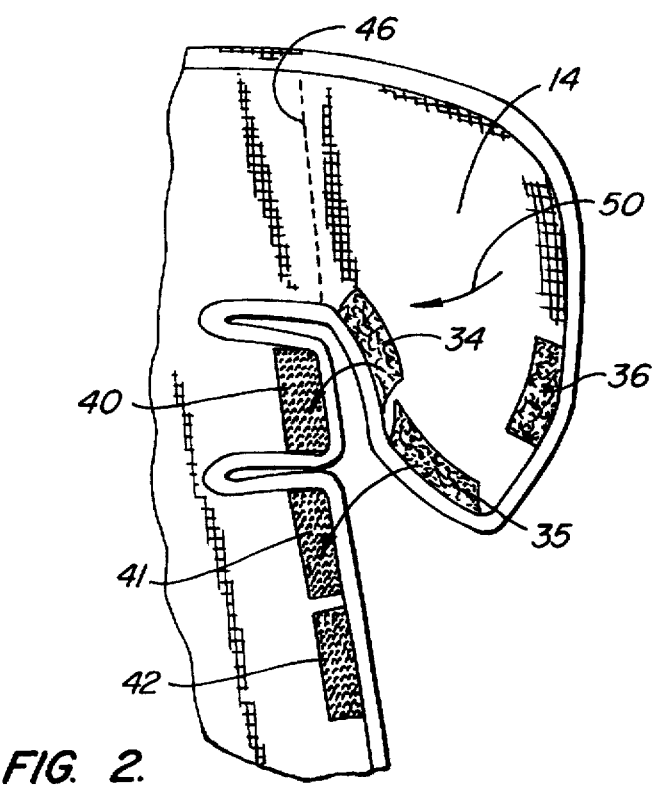
FIG. 2 is an enlarged detailed view illustrating the adjustment of the upper portion of the preferred embodiment.

As best shown in FIG. 2, the complementary hook and eye fasteners 31–42 enable the wing portions 12, 14 to be releasably secured with the wing portion (e.g. wing portion 14) folded forwardly in the direction of arrow 50 in a wide variety of attitudes to accommodate the relative position and size of the child's head to be cushioned. Thus, wing portion 14 (as well as wing portion 12) may be adjusted vertically with respect to the central portions 15, 17 and 20, laterally and rotationally about the fold seam 46. In this connection, it is noted that the lowermost fastener tab 36 and cooperating strip 42 serve to secure the wing portion 14 in the forward folded position folded about the seam 46.

Figure 3:
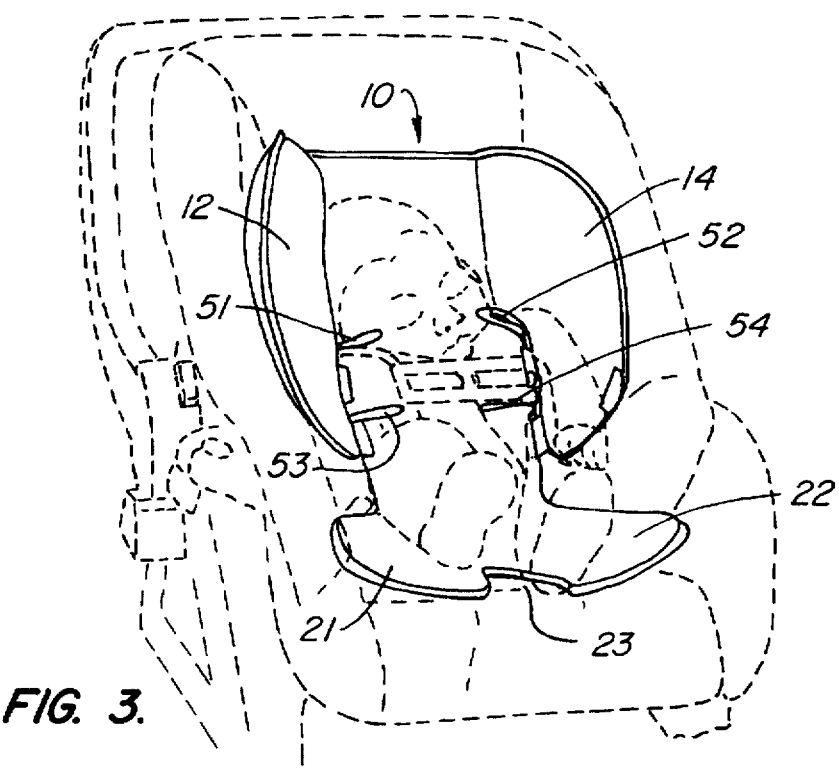
FIG. 3 is a perspective view illustrating use of the invention with an infant.
Figure 4:
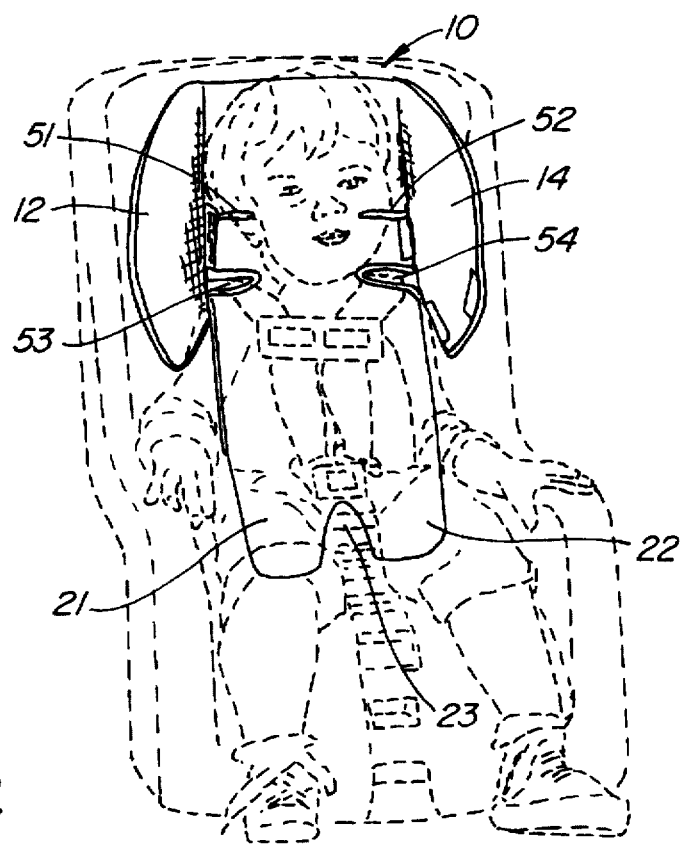
FIG. 4 is a perspective view illustrating of the invention with a toddler.

FIGS. 3 and 4 illustrate the two extreme configuration ranges of the support 10, with FIG. 3 illustrating use with a small infant and FIG. 4 illustrating use with a large toddler. As seen in FIG. 3, when used with a small infant the support 10 is arranged in an attitude in which the support 10 is folded essentially horizontally about a line extending across the lower central portion 20 below the fastener strip 36 and cooperating strip 42. Wing portions 12, 14 are folded forward to provide support for the head of the infant as shown. The flanking gaps 51, 52 between the lower edge of the upper central portion 15 and the upper edge of the flap portions 18, 19 accommodate the safety belts when the support 10 is used in an automobile environment, such as in a conventional car seat or an infant carrier/car seat combination. The crotch belt is accommodated by the gap 23 between the two lower leg portions 21, 22.

In contrast, and with reference to FIG. 4, when the support 10 is used with a large toddler, the support 10 is arranged in an attitude in which the central regions are upstanding, while the wing portions 12, 14 are folded forwardly and inwardly to accommodate the larger head of the toddler. When used in an automobile application, the lower gaps 53, 54 between the elements 18, 19 and the upper edges of the lower central region 20 accommodate the safety belts. For children of intermediate size between the two extremes illustrated in FIGS. 3 and 4, the support 10 can be readily adjusted to the proper attitude.

In the preferred embodiment, the dimensions designated in FIG. 1 are as follows:

| Dimension | Size |
| --- | --- |
| A | 8 inches |
| B | 4 ½inches |
| C | 10 ½inches |
| D | 23 ½inches |
| E | 8 inches |
| F | 2 inches |
| G | 3 inches |
| H | 14 ½inches |
| I | 10 ⅛inches |
| J | 4 ⅛inches |
| K | 4 ½inches |

These dimensions are believed ideal to provide an ideal range of adjustments for the preferred embodiment of the invention.

As will now be apparent, head supports fabricated according to the teachings of the invention provide several advantages over known supports. Firstly, the invention can be fabricated from relatively inexpensive materials in a relatively simple fashion. Secondly, the invention provides wide adjustability to fit a large range of body sizes from a very small infant to a toddler of advanced size (e.g. a 40 pound four-year old child). In addition, the invention can be used with a wide variety of child carriers, including regular automobile seats, combined child carrier/car seats, strollers and swings. Most importantly, a single such support automatically adjusts to the growth of a child from a small infant to an advanced toddler, so that a parent need only purchase one such support over the period of growth.

While the above provides a full and complete disclosure of the preferred embodiments of the invention, various modifications, alternate constructions and equivalents may be employed, as desired. For example, while specific materials and dimensions have been shown and described, other materials, fasteners and dimensions may be employed if deemed suitable for a given application. Therefore, the above description and illustrations should not be construed as limiting the scope of the invention, which is defined by the appended claims.

What is claimed is:

1. An adjustable head support for use with a child ranging in size from a small infant to a large toddler, said support comprising:

a soft pliable body structure having a pair of flanking wing portions joined to an upper region of a compound central portion, said compound central portion including a lower region and a region intermediate said upper region and said lower region, said intermediate region including a pair of opposing flap sections having upper and lower edges forming gaps with the lower and upper edges of said upper and lower regions of said central portion, respectively, in order to provide safety belt apertures; and a plurality of complementary fastener elements arranged along a lower periphery of said wing portions and an outer perimeter of said intermediate and said lower regions of said central portion to permit adjustment of the relative positions of said wing portions and said central portion.

2. The invention of claim 1 wherein said lower region of said central portion terminates in a pair of leg sections separated by a gap for accommodating a child seat restraint.

3. The invention of claim 1 wherein said pliable body structure comprises outer panels and a padding material positioned therebetween.

4. The invention of claim 3 wherein said padding is thicker in said wing portions than said central portion.

5. The invention of claim 1 further including a fold seam provided between each of said wing portions and said central portion to promote folding therebetween.

6. The invention of claim 1 wherein said plurality of complementary fastener elements comprises a first group of fastener tabs each attached at a different location of said lower periphery of said wing portions and a second group of fastener strips each secured at a different location of said outer perimeter of said intermediate and lower regions of said central portion at a position associated to a corresponding one of said fastener tabs.

7. The invention of claim 6 wherein said pair of opposing flap sections each has a fastener strip from said second group secured thereto.

8. The invention of claim 6 wherein each of said wing portions has an outer edge, and wherein a fastener tab is located along said outer edge.

* * * * *